J. C. H. GRANT.
SPRING FITTING FOR VEHICLE AXLES.
APPLICATION FILED APR. 23, 1919.

1,353,470.

Patented Sept. 21, 1920.
2 SHEETS—SHEET 1.

Inventor.
Josceline C. H. Grant.
By J. Walter Fowler
Atty.

J. C. H. GRANT.
SPRING FITTING FOR VEHICLE AXLES.
APPLICATION FILED APR. 23, 1919.
1,353,470. Patented Sept. 21, 1920.
2 SHEETS—SHEET 2.
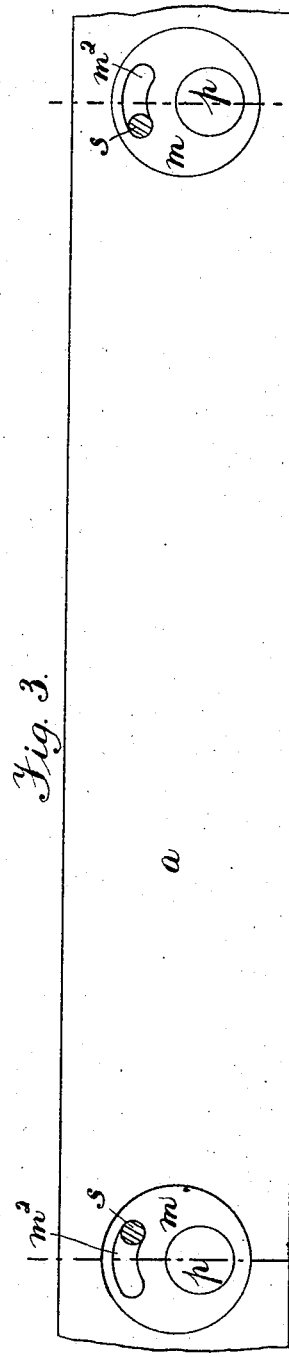
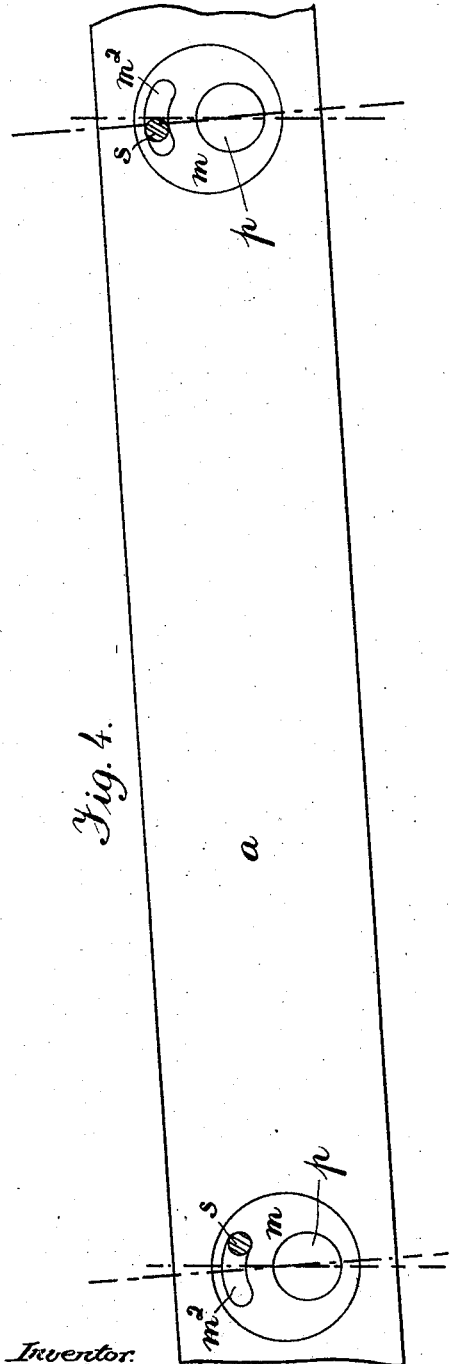
Inventor:
Josceline C. H. Grant,
By J. Walter Fowler
Atty.

UNITED STATES PATENT OFFICE.

JOSCELINE C. H. GRANT, OF CHANIA BRIDGE, BRITISH EAST AFRICA.

SPRING-FITTING FOR VEHICLE-AXLES.

1,353,470.  Specification of Letters Patent.  Patented Sept. 21, 1920.

Application filed April 23, 1919. Serial No. 292,034.

*To all whom it may concern:*

Be it known that I, JOSCELINE CHARLES HENRY GRANT, a subject of the King of England, residing at Chania Bridge, British East Africa, have invented certain new and useful Improvements in Spring-Fittings for Vehicle-Axles, of which the following is a specification.

This invention has reference to the spring mountings of automobile vehicles. It has for object to provide an improved connection between the springs and the road-wheel axles of such vehicles, which will lessen distortion of or strain upon the parts, and also mitigate shocks or jars which would otherwise be imparted to the vehicle.

According to the present invention, I interpose between the laminated or other spring and the road-wheel axle, a hinged or pivoted joint which, while holding the spring and axle together, will allow relative hinged or pivotal movement to take place between said parts.

The invention is hereafter more fully described with reference to the accompanying drawings, in which:—

Figs. 3 and 4 are diagrammatic views showing the action of the device.

Figure 1:
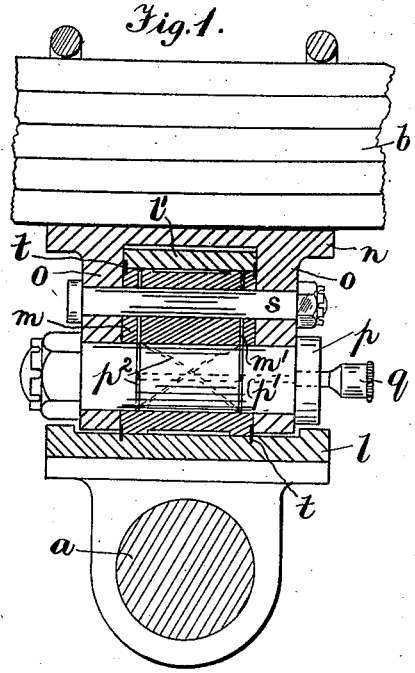
Figure 1 is a part sectional view and part elevation of a spring mounting for a vehicle embodying my invention.
Figure 2:
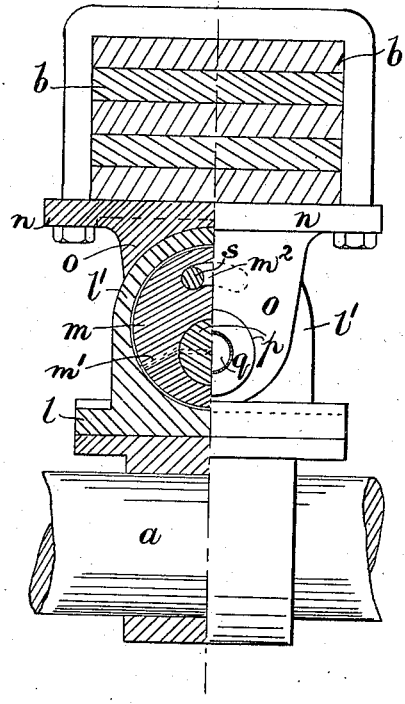
Fig. 2 is a part sectional view and part elevation taken at right angles to Fig. 1.

According to the construction shown in Figs. 1 and 2, the axle $a$ is as usual normally disposed parallel to the plane of the chassis and is provided with a steel or other bracket $l$ carried by the axle and having a circular socket $l'$ in which is fitted a bush $m$ of phosphor-bronze or the like. A saddle $n$ to which the laminated spring $b$ is secured, carries two parallel plates or lugs $o$ adapted to fit over the ends of the socket $l'$ and bush $m$, while a swivel pin or bolt $p$ passes through these parts and secures them together, so constituting a pivotal attachment. The bolt $p$ is drilled axially for a portion of its length at $p'$ to communicate with a grease cup $q$ by means of which lubricant may be supplied through the passage $p'$ and grease-ways $p^2$, $m'$ to the sliding surfaces.

The bolt $p$ is located eccentrically of the bush $m$ as shown, and allows space for a second bolt or stop-pin $s$ which passes through parallel to the bolt $p$; this pin $s$ is fitted tightly in the lugs $o$ but travels freely in a slot $m^2$ in the bush $m$ so as not to impede the rocking motion of the joint necessary to allow for positions of the axle other than parallel to the plane of the chassis, due to deflection of one spring more than the other. Thus this construction affords a means for obviating torsional stresses on the springs. The length of the slot $m^2$ may, however, be arranged to limit this motion as desired and to steady the vehicle automatically when centrifugal action occurs.

In the normal position, when the axle and chassis are horizontal, the stop-pins $s$ are at the inner ends of the slots in their respective bushes $m$, but when the axle moves relatively to the chassis so that these parts are no longer parallel, the position of the center of one of the two sets of fittings on the axle alters relatively to the center of the fitting for the spring at the other end of the axle.

Thus the bush $m$ at the left hand end of the axle, Fig. 4, being held by the stop pin $s$ has not rotated with the axle but remains in the same vertical position as in Fig. 3. On the other hand the bush at the right hand end of the axle has rotated counter-clockwise with the axle, the stop pin $s$ in this case traveling in the slot $m^2$ and therefore allowing the bush to rotate. By this motion the distance between the eccentric pivot bolts $p$ measured along the axle, has been increased proportionally to the angle of inclination; this increase compensates for the decrease in the horizontal distance between the centers of the bushes. In the one case the center of rotation is the axial center of the bushing $m$, and in the other case the pin $p$. Consequently the horizontal distance between the attachments of the springs will remain substantially constant for any practicable inclination of the axle in relation to the chassis.

Upon the return of the axle to its normal horizontal position, the right-hand bush $m$ which has rotated is automatically restored to the position shown in Fig. 3, by the load acting on the eccentric pivot bolt $p$, and by the friction of the inclosing socket, resulting in a movement proportional to the eccentricity of the bush. The final positions of the two bushes are limited by the stop-pins engaging the ends of the slots as seen in Figs. 2 and 3.

These slots are curved concentrically of the pivot bolts $p$ and may extend on each side of the central plane as shown in Fig. 2, or only on the outer side; in the latter case the stop-pin $s$ is located on the center line so as to occupy the inner end of the slot in the normal position.

The stop-pins $s$ also prevent relative lateral movement of the axle to chassis due to the action of centrifugal force or to the whole vehicle being canted on an angle, for the stop-pins bear on the inner ends of the working slots $m^2$ in the bushes, and, therefore, movement can only take place by the swiveling of the axle.

Felt retaining washers $t$ for the lubricant are shown fitted in circular grooves around the bush $m$.

The pivotal joint is usually incased in a leather or similar sheathing to exclude dust, wet and the like.

What I claim is:—

1. A spring fitting for vehicle axles, comprising interengaging members secured to the spring and the axle respectively, a cylindrical socket upon one of said members, lugs upon the other of said members, said lugs covering open ends of said socket, a revoluble bush mounted in said socket, means for securing said bush to said lugs, and means for limiting the relative rotation between said socket and bush.

2. A spring fitting for vehicle axles, comprising interengaging members secured to the spring and the axle respectively, a joint connecting said members to allow partial relative rotation on an axis perpendicular to the axle, and means for limiting their relative movement.

3. A spring fitting for vehicle axles, comprising interengaging members secured to the spring and the axle respectively, a swivel joint connecting said members, said swivel joint allowing partial relative rotation of said members on a horizontal axis perpendicular to the axle, means for limiting said rotation to one direction from the normal position, and means for preventing separation of said members.

4. A spring fitting for vehicle axles, comprising interengaging members secured to the spring and the axle respectively, a cylindrical socket upon one of the said members, lugs upon the other of said members, said lugs covering the open ends of said socket, a revoluble bush mounted in said socket, a swivel pin connecting said lugs through said bush, said pin being located eccentrically to said bush, and a stop pin parallel to said swivel pin and also connecting said lugs through said bush, said bush slotted to allow movement of said stop-pin concentrically to said swivel pin.

5. A spring fitting for vehicle axles, comprising a socket secured to the axle, a bush revoluble in said socket, a swivel pin, said socket, bush and pin having their axes perpendicular to the length of the axle, means for connecting said swivel pin to the spring and a stop pin secured to said connecting means parallel to said swivel pin, said bush being slotted concentrically to said swivel pin, said stop pin traveling in the slot in said bush, and the stop pins of fittings on the same axle resting normally at the adjacent inner ends of said slots when the axle is parallel to the vehicle.

In testimony whereof I have affixed my signature in presence of two witnesses.

JOSCELINE C. H. GRANT.

Witnesses:
 ERNEST T. HOWARD,
 CYRIL J. FEENY.